United States Patent

[11] 3,604,761

| [72] | Inventors | Atutoshi Okamoto<br>Toyohashi-shi;<br>Noriyoshi Ando, Kariya-shi; Koichi Taniguchi, Kariya-shi; Yoshiaki Nakano, Gifu-shi; Koichi Toyama, Toyohashi-shi, all of, Japan |
|---|---|---|
| [21] | Appl. No. | 832,664 |
| [22] | Filed | June 12, 1969 |
| [45] | Patented | Sept. 14, 1971 |
| [73] | Assignee | Nippon Denso Kabushiki Kaisha<br>Kariya-shi, Japan |
| [32] | Priority | Aug. 21, 1968 |
| [33] | | Japan |
| [31] | | 43/59651 |

[54] ANTISKID CONTROL SYSTEM
2 Claims, 2 Drawing Figs.

[52] U.S. Cl. .................................................. 303/21 CG,
188/181 A, 303/20, 303/21 BE
[51] Int. Cl. ....................................................... B60t 8/12
[50] Field of Search........................................... 188/181 A,
181 C; 303/20, 21 A, 21 BB, 21 CG

[56] References Cited
UNITED STATES PATENTS

| 3,433,536 | 3/1969 | Skinner ........................ | 188/181 C |
| 3,499,689 | 3/1970 | Carp et al. .................... | 303/21 (A4) |
| 3,511,542 | 5/1970 | Fielek, Jr. ..................... | 188/181 A |

*Primary Examiner*—Milton Buchler
*Assistant Examiner*—Stephen G. Kunin
*Attorney*—Cushman, Darby & Cushman

ABSTRACT: An antiskid control system so constructed that upon application of the braking force to the wheel, the maximum peripheral wheel deceleration developed in the wheel is sensed and stored such that a peripheral wheel deceleration-sensing level is set automatically to a value such as 0.1 g., if said maximum peripheral wheel deceleration is large, while such peripheral wheel deceleration-sensing level is set automatically to a value of 0.8 g., for example, if said maximum peripheral wheel deceleration is small. Thus, this antiskid control system is highly adaptable to various coefficients of road adhesion, operating equally well on rough or slippery road surfaces.

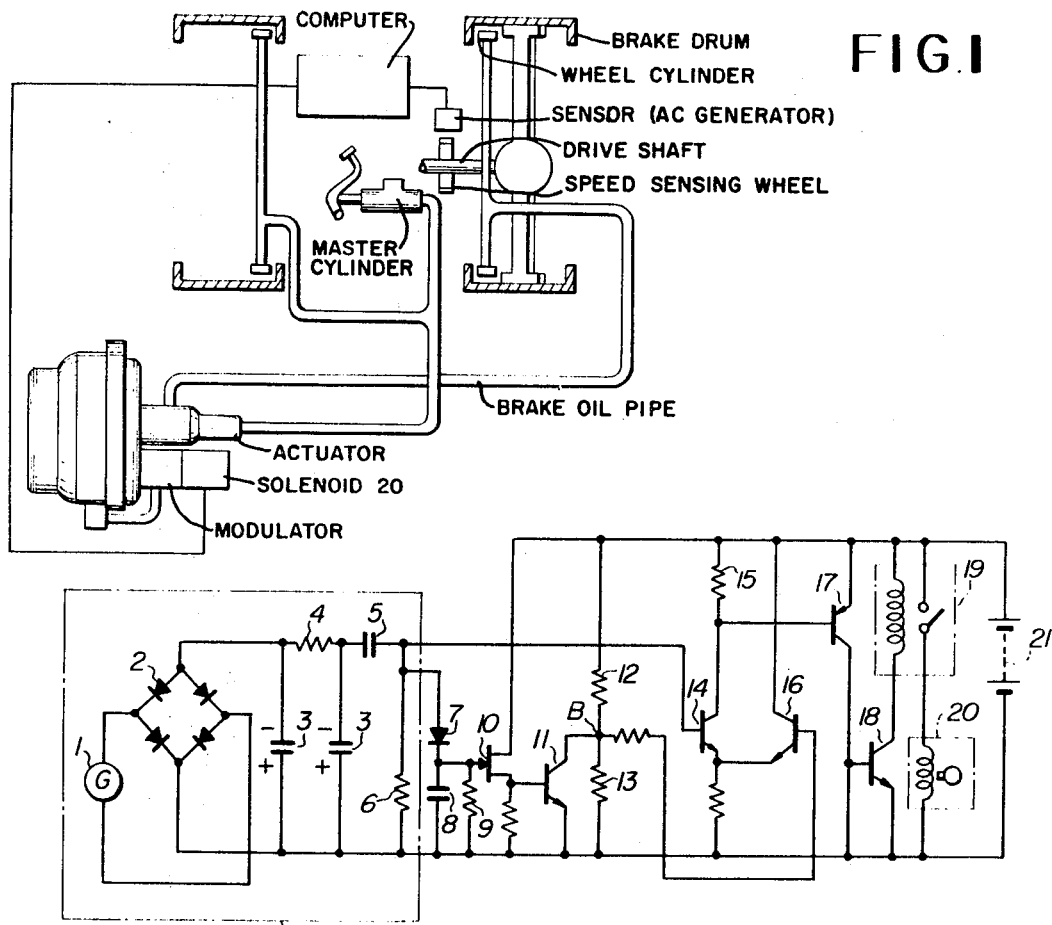

ANTISKID CONTROL SYSTEM

BACKGROUND OF THE INVENTION

1. Field of the Invention

The present invention relates generally to antiskid control systems and more particularly to an antiskid control system designed to prevent, in passenger transportation vehicles such as an automobile, the occurrence of lost steering power of a steering wheel, irregular gyration of the car body and the like that may take place when the braking force is applied excessively. Still more particularly, the present invention relates to an antiskid control system in which peripheral wheel deceleration signals and the maximum peripheral wheel deceleration signal are detected and the braking force applied to the wheel is interruptedly controlled in accordance with both of these signals.

2. Description of the Prior Art

In the prior art antiskid devices for automobiles, the peripheral wheel speed is converted into an electrical quantity by means of an AC generator connected to a wheel driving shaft and an AC voltage proportional to this peripheral wheel speed is then converted in to a DC voltage through a rectifier circuit and a smoothing circuit. This DC voltage is in turn applied across a differentiator circuit whose output signal represents the time rate of change of said DC voltage that goes with the decrease in the wheel speed upon application of the brakes or the peripheral wheel deceleration which is the time derivative of the peripheral wheel speed. Thus, if this peripheral wheel deceleration exceeds a predetermined peripheral wheel deceleration sensing level of 0.8 $g$ (where $g$ is the acceleration of gravity), for example, the braking force applied to the wheel is released regardless of whether the driver releases the brakes applied. On the other hand, if the peripheral wheel deceleration drops below 0.8 $g$ upon said braking force releasing action, the braking force is again applied to the wheel. Thus, by repeating this process it is possible to brake and stop the car without stopping the rotation of the wheel.

However, the prior art devices as above described have drawbacks. If, for instance, the peripheral wheel deceleration-sensing level is preset to the value of 0.8 $g$ so that an antiskid control action is ensured which is effective on road surfaces with higher coefficients of adhesion such as in the case of a dry asphalt road surface, the emergency application of the brakes on a dry asphalt road surface or the like where the coefficient of road adhesion is close to or higher than the present value of 0.8 $g$, may permit the wheels to continue to rotate at a certain rate of retardation until the car is stopped with a result that the car may be braked and stopped in a positive manner without occurrence of irregular gyration of the car or the like. However, if the brakes are applied urgently on a snowy frozen road surface or the like with a low coefficient of adhesion of 0.1 $g$, for instance, the wheel slow down the speed at the peripheral deceleration of 0.8 $g$, whereas the car body decreases the speed at the deceleration of 0.1 $g$ corresponding to the said coefficient of road adhesion, so that the wheels stop while the brakes are being applied. The result is an irregular gyration of the car body and the like which is very dangerous. In other words, there is a disadvantage in that satisfactory antiskid control action cannot be equally ensured under different conditions, such as in the case of a dry asphalt road surface and a snowy frozen surface where their coefficients of adhesion differ considerably from each other. Indeed, the wheels will not be caused to stop rotating even on a snowy frozen road, if the peripheral wheel deceleration-sensing level is present to the value of 0.1 $g$. However, this gives rise to a problem of considerably extending the stopping distance required for the car to stop, and particularly this problem is so critically manifested on a dry asphalt road surface that the operational merit of the antiskid control action will become null and void.

SUMMARY OF THE INVENTION

The object of the present invention is to provide an antiskid control system comprising a peripheral wheel deceleration sensing or detecting means, a maximum peripheral wheel deceleration detection or storage means adapted to store the maximum value of the peripheral wheel deceleration signals from said sensing means for producing a controlled signal related to the coefficient of road adhesion from said maximum value, and a braking force release mechanism, wherein a peripheral wheel deceleration reference or set level is maintained at a value inversely proportionate to the maximum peripheral wheel deceleration signal from said maximum peripheral wheel deceleration sensing means such that when said peripheral wheel deceleration signal exceeds said peripheral wheel deceleration reference level, said braking-force release mechanism is actuated to forcibly release the braking force applied to the wheel.

According to the present invention greater effectiveness is achieved in that because the maximum value of the peripheral wheel deceleration is stored and the peripheral wheel deceleration-sensing level is automatically changed in inverse proportion to said maximum value, antiskid control action is provided which is highly adaptable to different road surfaces and equally effective to all kinds of road surfaces ranging from slippery to rough conditions.

Accordingly to the present invention, there is further provided an antiskid control system which is simple in construction and highly reliable in operation because this system is not provided with any other detectors, such as peripheral wheel deceleration-detecting elements that convert the wheel speed, that is, the physical displacement into an electrical displacement, and thus it does not need a number of generators or the like which detect such physical displacements.

BRIEF DESCRIPTION OF THE DRAWINGS

FIG. 1 shows a schematic diagram illustrating an embodiment of an antiskid control system in a vehicle hydraulic brake system according to the present invention.

FIG. 2 shows an electrical connection diagram illustrating an embodiment of a control circuit to be used as the computer in FIG. 1.

DESCRIPTION OF THE PREFERRED EMBODIMENT

The present invention will be discussed hereinafter referring to FIG. 2 of the accompanying drawings in which A designates a peripheral wheel deceleration-sensing means; 1 an AC generator to detect the wheel speed; 2 a rectifier; 3 a smoothing condenser; 4 a smoothing resistance. Numeral 5 designates a capacitor for differentiator circuit; 6 a resistor for differentiator circuit; 7 a diode for preventing reverse current; 8 a capacitor for storing the maximum peripheral wheel deceleration; 9 a discharge resistor for erasing the voltage corresponding to the maximum peripheral wheel deceleration stored in the capacitor 8 with a suitable time constant; 10 a field-effect transistor for providing a high input impedance; 11 a transistor for applying a voltage inversely proportioned to the magnitude of the maximum peripheral wheel deceleration to one input end of a difference amplifier. Numerals 12 and 13 are voltage-dividing resistors; 14 and 16 transistors forming the difference amplifier; 15 a load resistance of the transistor 14; 17 an amplifier transistor; 18 a transistor for actuating a relay 19. Numeral 20 is a solenoid valve to discontinue the braking force and adapted to release the braking force when energized; 21 a car-loaded battery. The maximum peripheral wheel deceleration storage capacitor 8 forms the maximum peripheral wheel deceleration detection and storage means, while the solenoid valve 20 constitutes the braking-force release mechanism.

Constructed as above described, the operation of the system according to the present invention will be discussed hereinafter. As the wheel speed is differentiated by the differentiator capacitor 5 and the resistor 6, a peripheral wheel deceleration signal voltage is developed across the resistor 6. This signal voltage is applied to the base of the transistor 14 which is one of the transistors forming a difference amplifier or detecting means for generating a brake release signal when the wheel deceleration signal exceeds the set point value. At the same time, the signal voltage is applied to and stored by a storage means comprising capacitor 8 through the diode 7. It is prearranged so that if the voltage stored by the capacitor 8 is lower than, for instance, 2.0 g in terms of the peripheral wheel deceleration, the value of the voltage developed at the junction B of the voltage dividing resistors 12 and 13 corresponds to, for instance, 0.8 g in terms of the peripheral wheel deceleration and a voltage corresponding to this peripheral wheel deceleration reference level is applied to the base of transistor 16. On the other hand, if the peripheral wheel deceleration stored by the capacitor 8 exceeds the 2.0 g, the peripheral wheel deceleration reference level at the point B is reduced in inverse proportion to the stored value, that is, if the peripheral wheel deceleration stored by the capacitor 8 rises to a maximum of 10 g, the peripheral wheel deceleration reference level at the point B is switched to 0.1 g thus providing a reference means for generating a set point value of deceleration which is automatically changed in value according to the control signal related to said maximum value of wheel deceleration which is, in turn, inversely related to the road surface coefficient of adhesion. Under such prearranged conditions, though the application of braking force to the wheel causes peripheral deceleration of the wheel, as long as the antiskid control system is in operation this peripheral wheel deceleration can never exceed 2.0 g on a rough road surface and the peripheral wheel deceleration-sensing level is set to 0.8 g so that the solenoid valve 20 is turned on or off with this sensing level of 0.8 g as a borderline. On the other hand, the peripheral wheel deceleration can easily exceed the value of 2.0 g on a slippery road surface. If braking force is applied to the wheel on an extremely slippery road surface, for example, the peripheral wheel deceleration increases gradually until it first rises above 0.8 g at which a braking-force release signal is produced. On a slippery road surface, however, the wheel speed continues to decrease for a while even after the braking force release signal has been provided. In fact, acceleration of the wheel starts to take place only after the maximum peripheral wheel deceleration has attained 10 g. This maximum peripheral wheel deceleration of 10 g is stored by the capacitor 8 and the peripheral wheel deceleration-sensing level is thus set to 0.1 g. With the sensing level thus set to 0.1 g, the solenoid valve 20 is turned on or off each time the peripheral wheel deceleration rises above or falls below this sensing level of 0.1 g, even if the deceleration of the wheel has occurred again as a result of the acceleration of the wheel and consequent sending of a braking-force application signal.

From the foregoing it will be apparent that coefficients of road adhesion may be indirectly detected with the maximum peripheral wheel deceleration stored by the capacitor 8 so that the peripheral wheel deceleration-sensing level is set to 0.8 g if the peripheral wheel deceleration does not exceed 2.0 g on a rough road surface, while the sensing level is reduced from 0.8 g to 0.1 g in inverse proportion to the magnitude of the peripheral wheel deceleration if a peripheral wheel deceleration exceeding 2.0 g takes place.

We claim:
1. An antiskid control system for a vehicle comprising:
wheel deceleration detecting means for generating a wheel deceleration signal corresponding to deceleration of at least one wheel of said vehicle,
storage means connected to said detecting means for storing a maximum value of said wheel deceleration signal and for producing a control signal related to said maximum value which is, in turn, inversely related to a coefficient of adhesion for a road surface,
reference means for generating a set point value of wheel deceleration,
said reference means being connected to said storage means and including means for changing said set point value according to said control signal,
detecting means for detecting a brake release signal when said wheel deceleration signal exceeds said set point value and,
brake release means for releasing a braking force applied to said wheel in response to said brake release signal.
2. An antiskid control system as in claim 1 wherein said storage means comprises:
a reverse-current-blocking diode connected to said wheel-deceleration-detecting means, and
a capacitor connected to said wheel-deceleration-detecting means through said diode.